United States Patent
Kuvettu et al.

(10) Patent No.: US 10,252,249 B2
(45) Date of Patent: Apr. 9, 2019

(54) COMPOSITION AND A PROCESS FOR PREPARATION OF ATTRITION RESISTANT CRACKING CATALYST SUITABLE FOR ENHANCING LIGHT OLEFINS

(71) Applicant: Indian Oil Corporation Limited, Bandra (East), Mumbai (IN)

(72) Inventors: Mohan Prabhu Kuvettu, Faridabad (IN); Mahesh Kadgaonkar, Faridabad (IN); Biswanath Sarkar, Faridabad (IN); Arumugam Velayutham Karthikeyani, Faridabad (IN); Balaiah Swamy, Faridabad (IN); Mani Karthikeyan, Faridabad (IN); Jayaraj Christopher, Faridabad (IN); Brijesh Kumar, New Delhi (IN)

(73) Assignee: INDIAN OIL CORPORATION LIMITED, Bandra (East), Mumbai (IN)

( * ) Notice: Subject to any disclaimer, the term of this patent is extended or adjusted under 35 U.S.C. 154(b) by 169 days.

(21) Appl. No.: 15/236,899

(22) Filed: Aug. 15, 2016

(65) Prior Publication Data
US 2017/0056864 A1 Mar. 2, 2017

(30) Foreign Application Priority Data
Aug. 24, 2015 (IN) .................. 3227/MUM/2015

(51) Int. Cl.
| | | |
|---|---|---|
| *B01J 29/06* | (2006.01) | |
| *B01J 29/00* | (2006.01) | |
| *B01J 29/18* | (2006.01) | |
| *B01J 29/40* | (2006.01) | |
| *B01J 37/00* | (2006.01) | |
| *C01B 25/36* | (2006.01) | |
| *C10G 11/18* | (2006.01) | |
| *B01J 29/70* | (2006.01) | |
| *B01J 35/02* | (2006.01) | |
| *B01J 29/83* | (2006.01) | |

(52) U.S. Cl.
CPC ............ *B01J 29/005* (2013.01); *B01J 29/18* (2013.01); *B01J 29/40* (2013.01); *B01J 29/7007* (2013.01); *B01J 35/023* (2013.01); *B01J 37/0045* (2013.01); *C01B 25/36* (2013.01); *C10G 11/182* (2013.01); *B01J 29/83* (2013.01); *B01J 2229/186* (2013.01); *B01J 2229/42* (2013.01)

(58) Field of Classification Search
CPC ...... B01L 29/18; B01L 29/40; B01L 29/7007; B01L 35/023; B01L 37/0045; B01L 37/0009; B01L 2229/42; C01B 25/36
USPC ....... 502/60, 63, 64, 68, 69, 71, 78; 423/309
See application file for complete search history.

(56) References Cited

U.S. PATENT DOCUMENTS

| | | |
|---|---|---|
| 3,847,793 A | 11/1974 | Schwartz et al. |
| 4,309,280 A | 1/1982 | Rosinski et al. |
| 4,784,745 A | 11/1988 | Nace |
| 4,828,679 A | 5/1989 | Cormier, Jr. et al. |
| 4,867,863 A | 9/1989 | Herbst et al. |
| 5,039,640 A | 8/1991 | Absil et al. |
| 5,055,437 A | 10/1991 | Herbst et al. |
| 5,190,902 A | 3/1993 | Demmel |
| 5,286,369 A | 2/1994 | Roberie et al. |
| 5,348,643 A | 9/1994 | Absil et al. |
| 5,846,402 A | 12/1998 | Mandal et al. |
| 5,997,728 A | 12/1999 | Adewuyi et al. |
| 6,137,022 A | 10/2000 | Kuechler et al. |
| 6,258,257 B1 | 7/2001 | Swan et al. |
| 6,613,710 B2 | 9/2003 | Ray et al. |
| 6,677,263 B2 | 1/2004 | Wang et al. |
| 7,517,827 B2 | 8/2009 | Ravichandran et al. |
| 2015/0209771 A1* | 7/2015 | Saka ................. B01J 29/80 208/114 |

FOREIGN PATENT DOCUMENTS

| | | |
|---|---|---|
| CA | 2156607 A1 | 9/1994 |
| EP | 0167325 A3 | 1/1986 |
| EP | 0643621 B1 | 8/1997 |

\* cited by examiner

*Primary Examiner* — Elizabeth D Wood
(74) *Attorney, Agent, or Firm* — Workman Nydegger

(57) ABSTRACT

The present invention relates to a composition of attrition resistant attrition resistant catalyst particularly for FCC catalyst additives such as ZSM-5, bottom cracking additive/residue upgradation additive and GSR additive comprising aluminum phosphate binder wherein said binder comprising of 1.5 to 2.9 moles equivalent of monobasic acid for each mole of mono-aluminum phosphate (MAP). Further, the aluminum phosphate binder is added to the catalyst additive to ensure effective binding of catalyst as well as preserving catalyst activity with high selectivity towards light olefins including LPG.

6 Claims, No Drawings

COMPOSITION AND A PROCESS FOR PREPARATION OF ATTRITION RESISTANT CRACKING CATALYST SUITABLE FOR ENHANCING LIGHT OLEFINS

FIELD OF THE INVENTION

The present invention relates to a composition of an attrition resistant hydrocarbon cracking catalyst additive particularly FCC catalyst additives including ZSM-5, bottom cracking additive/residue upgradation additive and GSR additive wherein said additive has ABD above 0.75 gm/cc, AI based on ASTM D-5757 is less than 5 and average particle size in the range of 80-100 microns. The present invention further provides the process of preparation said attrition resistant hydrocarbon cracking catalyst additive composition.

BACKGROUND OF THE INVENTION

Zeolite based catalysts are generally known for catalytic hydrocarbon conversion operations, such as cracking. The cracking process involves breakdown of hydrocarbon vapours on contacting with cracking catalyst at a relatively high temperature. In this process, the catalyst becomes contaminated with carbon and high-boiling hydrocarbon. In order to remove the contaminants, the catalyst is subjected to regeneration before it is returned to the cracking zone. The catalyst is firstly purged with steam to remove hydrocarbon vapors and then is regenerated by burning of coke in regeneration zone. The regeneration temperature is many degrees higher than the reaction temperature. Generally, during the process of regeneration, the zeolite component of the catalysts loses a substantial portion of its crystallinity and activity. The zeolite catalysts referred to above are unstable when subjected to high temperatures, particularly in the presence of steam. Their catalytic activity is reduced rapidly. There had been a lot research done in this field of improving the stability of the catalyst. There are many literature in the prior art which teaches the attrition resistant zeolite based catalysts but there has been a very less information or knowledge of aluminium phosphate binder based zeolite catalyst which are stable and selective towards a particular category of hydrocarbons such as light olefins, LPG.

Following patents illustrate prior art processes and compositions which are different from present invention with respect to composition, process and performance.

U.S. Pat. No. 3,847,793 describes a process for conversion of hydrocarbons with a dual cracking component catalyst comprising ZSM-5 zeolite based catalyst and large pore zeolite based catalyst.

U.S. Pat. No. 6,137,022 discloses a process of making an olefin product from an oxygenated feedstock by contacting the feedstock in a reaction zone containing 15 volume percent or less of a catalyst, preferably a catalyst comprising a silica-alumina-phosphate molecular sieve.

U.S. Pat. No. 6,258,257 refers to a process for producing polypropylene from C3 olefins by a two-stage fluid catalytic cracking process having two types of catalysts made from zeolites of large pore and medium pore.

EP 0167325A3 relates to higher make-up of catalyst that may contain 2 or 3 times the amount of ZSM-5 sought for the equilibrium catalyst.

U.S. Pat. No. 4,309,280 describes a process for maximizing of LPG by adding very small amounts of powdered, neat ZSM-5 catalyst, characterized by a particle size below 5 microns to the FCC catalyst inventory.

U.S. Pat. No. 5,190,902, CA2156607A1 and CP 0643621B1 refer to a processes for the preparation of attrition resistant binder particles by spray drying of clay phosphate slurry which was initially taken to extreme pH conditions, adding zeolite and adjusting pH, spray drying followed by calcination.

U.S. Pat. No. 5,286,369 relates to an aluminum phosphate binder for binding various zeolites, prepared by reacting aluminum nitrate with phosphoric acid. The nitric acid which is a by-product as shown in equation below is detrimental to the activity of the zeolite, which is the main key component of the catalyst product. The presence of nitric acid in the precursor slurry will takeout framework aluminum present in the zeolite, which is responsible for creating bronsted acid sites required for cracking of hydrocarbon molecules.

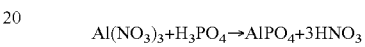

$$Al(NO_3)_3 + H_3PO_4 \rightarrow AlPO_4 + 3HNO_3$$

It may be noted that, higher the concentration of aluminum phosphate binder proportionally higher the content of nitric acid and to similar extent be the detrimental effect on zeolite activity.

U.S. Pat. No. 4,784,745 relates to a catalyst and a process for enhancing gasoline octane number of gasoline, wherein said shape-selective zeolite is selected from the group having the structure of ZSM-5, ZSM-11, ZSM-12, ZSM-23, ZSM-34, ZSM-35, ZSM-38, ZSM-48, ZSM-50, TMA Offretite and Erionite.

U.S. Pat. No. 4,828,679 relates to octane and total yield improvement in catalytic cracking of petroleum fractions under cracking conditions by adding to conventional cracking catalysts small amounts of an additive catalyst comprising a class of zeolites characterized by a silica to alumina mole ratio greater than 12 and a constraint index of 1 to 12 wherein the zeolite additive catalyst has a crystal size of between 0.2 to 10 microns.

U.S. Pat. No. 4,867,863 deals with a Resid catalytic cracking process utilizing ZSM-5 for increased gasoline octane.

U.S. Pat. No. 5,039,640 refers to a catalyst composition comprising of large pore crystalline molecular sieve component and an MCM-22 zeolite for catalytic cracking of a hydrocarbon oil to provide a product of increased octane number and increased C5+ gasoline content.

U.S. Pat. No. 5,055,437 deals with multi-component catalyst mixture having Ga in ZSM-5 and process for catalytic cracking of heavy hydrocarbon feed to lighter products.

U.S. Pat. No. 5,348,643, relates to a process for converting feedstock hydrocarbon compounds over a catalyst composition comprising clay and a zeolite component, at least one of which has been treated with a phosphorus-containing compound, which is spray dried at a low pH, to produce high octane gasoline and increased lower olefins, especially propylene and butylenes.

U.S. Pat. No. 5,846,402 relates to a process for selective catalytic cracking of a petroleum-based feedstock to produce a product having a high yield of liquefied petroleum gas (LPG) and light olefins having 3 to 4 carbons.

U.S. Pat. No. 5,997,728, refers to a process for cracking of heavy feed in an FCC unit, to enhance light olefins, without excessive production of aromatics, or loss of gasoline yield with large amounts of shape selective cracking additive preferably at least 10 wt % additive, of 12-40%

ZSM-5 on an amorphous support, equivalent to more than 3.0 wt % ZSM-5 crystal circulating with equilibrium catalyst.

U.S. Pat. No. 6,613,710 deals with a process for preparing bi-functional catalyst comprising of molecular sieves, modified clay and semi-basic alumina for effective cracking of high boiling petroleum feedstock to provide simultaneously, enhanced yields of Liquefied Petroleum Gas (LPG) and reduction of undesirable bottoms.

U.S. Pat. No. 6,677,263, discloses a catalytic promoter comprising of 5-65 wt % of modified HZSM-5 zeolite with Zn, P, Ga, Al, Ni and rare earth elements in an amount 0.01-10.37 wt % based on total weight of HZSM-5 zeolite to increase gasoline octane number and an increased lower olefin yield.

The U.S. Pat. No. 7,517,827 teaches preparation of cracking catalyst composition having high selectivity towards production light olefins such as LPG, propylene etc. achieved through treating the zeolite with sodium free basic compound with or without phosphate.

OBJECTIVES OF THE PRESENT INVENTION

An objective of this invention is to prepare an aluminium phosphate binder for FCC catalyst particularly for FCC catalyst additives such as ZSM-5, bottom cracking additive/residue upgradation additive and GSR additive comprising 1.5 to 2.9 moles equivalent of monobasic acid for each mole of mono-aluminium phosphate.

Further, objective of the present invention is to prepare an aluminium phosphate binder by reacting mono aluminum phosphate with another aluminium compound sourced from alumina nitrate, alumina sulfate, alumina chloride, alumina acetate and aluminum oxalate and it's suitability for incorporation in the ZSM-5 additive, bottom cracking additive/residue up-gradation additive and GSR additive formulation to enhance catalyst attrition resistance property as well as activity.

Furthermore, objective of this invention is to prepare an attrition resistant catalyst additive having zeolite content up to 70 wt %, possessing ABD above 0.75 g/cm$^3$ and ASTM AI below 5.

Definitions

ABD (Apparent Bulk Density): ABD as referred in the present invention is defined as the mass of many particles of the material divided by the total volume they occupy. Bulk density is not an instrinic property of a material it can change depending on how the material is handled.

ASTM AI: ASTM as referred in the present invention is the American Society for Testing and Material which has developed international standards for materials like catalysts. Attrition resistance is one of the key design parameters for catalysts used in fluidized-bed and slurry phase types of reactors. The ASTM fluidized-bed test has been one of the most commonly used attrition resistance evaluation methods and is the method used in to analyse the attrition index (AI) for the catalysts prepared as per the process of the present invention.

LPG: LPG as used in the present invention refers to Liquefied Petroleum Gas.

SUMMARY OF THE PRESENT INVENTION

The present invention relates to an attrition resistant hydrocarbon cracking catalyst additive composition comprising an aluminium phosphate binder, wherein the aluminium phosphate binder is a reaction product of mono aluminium phosphate (MAP) and an aluminium compound in the mole ratio of 1:1 to 1:2.5.

The present invention further relates to an attrition resistant hydrocarbon cracking catalyst additive composition comprising an aluminium phosphate binder, wherein the aluminium phosphate binder contains 1.5 to 2.9 moles equivalent of monobasic acid for each mole of aluminium phosphate binder.

Furthermore, the present invention relates to an attrition resistant cracking catalyst additive composition comprising of 10-70 wt % of zeolite, 5-20 wt % colloidal silica, 10-60 wt % clay, 1-15 wt % of aluminium phosphate binder and 1-10 wt % phosphate.

Furthermore, the present invention relates to a process of preparation of attrition resistant cracking catalyst additive composition comprising:
a) preparing a mono aluminum phosphate (MAP) by reacting the aluminium trihydrate slurry with desired amount of H$_3$PO$_4$ at 70-90° C. for the 1-3 h duration;
b) preparing an aluminium phosphate binder by reacting the mono aluminium phosphate (MAP) prepared in step (a) with an aluminium compound in a mole ratio of 1:1 to 1:2.5;
c) preparing phosphated zeolite slurry by adding di-ammonium hydrogen phosphate to zeolite;
d) preparing clay-silica-alumina phosphate slurry by adding kaolin clay slurry and the aluminium phosphate binder solution of step (b) to ammonium polysilicate;
e) preparing additive precursor slurry by adding the phosphated zeolite slurry of step (c) to the clay-silica-alumina phosphate slurry of step (d); and
f) spray drying and calcining the additive precursor slurry of step (e) to obtain the additive composition.

DESCRIPTION OF THE PRESENT INVENTION

In general, aluminium phosphate solution prepared as per the prior art literature contains very high concentration of free acid such as mono-basic acid which is detrimental to catalyst activity. It is found, application of such aluminium phosphate as a binder though provides ABD to the catalyst, but due to presence of acid, it is found to be detrimental to catalyst and hence not suitable to be used in catalyst composition.

Further, the catalyst which provides activity and selectivity towards light olefins, the ABD and AI resistance are found to be on the lower side. In order to ensure the catalyst retention in the process unit for a longer period, it is desirable to further increase the AI of the catalyst product.

While the invention is susceptible to various modifications and/or alternative processes and/or compositions, specific embodiment thereof has been shown by way of example in the drawings and tables and will be described in detail below. It should be understood, however that it is not intended to limit the invention to the particular processes and/or compositions disclosed, but on the contrary, the invention is to cover all modifications, equivalents, and alternative falling within the spirit and the scope of the invention as defined by the appended claims.

The graphs, tables, formulas, protocols have been represented where appropriate by conventional representations in the drawings, showing only those specific details that are pertinent to understanding the embodiments of the present invention so as not to obscure the disclosure with details that will be readily apparent to those of ordinary skill in the art having benefit of the description herein.

The following description is of exemplary embodiments only and is not intended to limit the scope, applicability or configuration of the invention in any way. Rather, the following description provides a convenient illustration for implementing exemplary embodiments of the invention. Various changes to the described embodiments may be made in the function and arrangement of the elements described without departing from the scope of the invention.

Accordingly, the main embodiment of the present invention relates to an attrition resistant hydrocarbon cracking catalyst additive composition comprising an aluminium phosphate binder, wherein the aluminium phosphate binder is a reaction product of mono aluminium phosphate and an aluminium compound in the mole ratio of 1:1 to 1:2.5.

In other embodiment, the present invention relates to an attrition resistant hydrocarbon cracking catalyst additive composition comprising an aluminium phosphate binder, wherein the aluminium phosphate binder contains 1.5 to 2.9 moles equivalent of monobasic acid for each mole of mono aluminium phosphate.

In another embodiment, the present invention relates to an attrition resistant hydrocarbon cracking catalyst additive composition wherein said composition comprises of 10-70 wt % zeolite, 5-20 wt % colloidal silica, 10-60 wt % clay, 1-10 wt % phosphate and 1-15 wt % aluminium phosphate binder.

In one another embodiment, said zeolite is selected from mordenite, ZSM-5, beta, ZSM-11 with silica alumina ratio ranging from 8 to 500.

In further embodiment, said attrition resistant cracking catalyst additive has ABD above 0.75 gm/cc, AI based on ASTM D-5757 is less than 5 and average particle size in the range of 80-100 microns.

In a preferred embodiment, said aluminium compound is selected from salts of alumina.

In another embodiment, said salts of alumina are selected from the group comprising of alumina nitrate, alumina sulphate, alumina chloride, alumina acetate and alumina oxalate wherein said salts of alumina in-situ generates monobasic acid.

In one another embodiment, said attrition resistant hydrocarbon cracking catalyst additive composition has LPG selectivity up to 27 wt %, propylene selectivity upto 8.9 wt %, at 5 wt % concentration in base catalyst.

In further embodiment, the present invention relates to a process of preparation of attrition resistant cracking catalyst additive composition comprising:
a) preparing a mono aluminum phosphate (MAP) by reacting the aluminium trihydrate slurry with desired amount of $H_3PO_4$ at 70-90° C. for the 1-3 h duration;
b) preparing an aluminium phosphate binder by reacting the mono aluminium phosphate (MAP) prepared in step (a) with an aluminium compound in a mole ratio of 1:1 to 1:2.5;
c) preparing phosphated zeolite slurry by adding di-ammonium hydrogen phosphate to zeolite;
d) preparing clay-silica-alumina phosphate slurry by adding kaolin clay slurry and the aluminium phosphate binder solution of step (b) to ammonium polysilicate;
e) preparing additive precursor slurry by adding the phosphated zeolite slurry of step (c) to the clay-silica-alumina phosphate slurry of step (d); and
f) spray drying and calcining the additive precursor slurry of step (e) to obtain the additive composition.

In one of the preferred embodiments, the present invention relates to a process for preparation of aluminium phosphate binder for an attrition resistant cracking catalyst additive comprising reacting mono-aluminium phosphate with aluminium compound wherein the monobasic acid derived from aluminium compound are present in ratio of 1.5 to 2.9 moles equivalent for each mole of mono-aluminium phosphate.

In another embodiment, the present invention relates to a process for preparation of aluminium phosphate binder by reacting mono-aluminium phosphate with aluminium compounds wherein said aluminium compounds are selected from salts of alumina.

In one of the preferred embodiments of the present invention, salts of alumina are selected from the group comprising of alumina nitrate, alumina sulphate, alumina chloride, alumina acetate and alumina oxalate.

In another preferred embodiment of the present invention, salts of alumina are selected from the group consisting of alumina nitrate, alumina sulphate, alumina chloride, alumina acetate and alumina oxalate.

In yet another embodiment, the present invention relates to process of preparation of aluminium phosphate binder by reacting mono-aluminium phosphate (MAP) with salts of alumina in the ratio of 1:1 to 1:2.5.

In further embodiment, the present invention relates to aluminium phosphate binder for attrition resistant catalyst additive wherein said binder is prepared by reacting mono-aluminium phosphate with aluminium compounds with the proviso that the monobasic acid derived from the aluminium compounds are present in ratio of 1.5 to 2.9 moles equivalent for each mole of mono-aluminium phosphate.

In a preferred embodiment, the zeolite used in preparation of attrition resistant cracking catalyst additive composition is selected from mordenite, ZSM-5, beta, ZSM-11 with silica alumina ratio ranging from 8 to 500. In the most preferred embodiment, the zeolite used in the catalyst additive composition is ZSM-5.

In another preferred embodiment, the above said monobasic acid is derived from aluminium compounds such as salts of alumina selected from the group consisting of alumina nitrate, alumina sulphate, alumina chloride, alumina acetate and alumina oxalate.

The process of the present invention provides a water soluble aluminium phosphate binder having a controller amount of mono-basic acid (up to 2.9 moles equivalent for each mole of mono-aluminium phosphate) which keeps aluminium phosphate bonder in free flowing liquid state.

In another embodiment, the present invention relates to the attrition resistant cracking catalyst composition consisting of 10-70 wt % of zeolite, 5-20 wt % colloidal silica, 10-60 wt % clay, 1-15 wt % of aluminium phosphate binder and 1-10 wt % phosphate, wherein said aluminium phosphate binder is a reaction product of mono aluminium phosphate and an aluminium compound in the mole ratio of 1:1 to 1:2.5 with a proviso that for each mole of mono-aluminium phosphate there exists 1.5 to 2.9 moles equivalent of monobasic acid.

In a preferred embodiment, a calculated amount of an ion radical in the form of salts of alumina (i.e. aluminium compounds) is added to the catalyst to ensure effective binding of catalyst as well as preserving catalyst activity with high selectivity towards olefins.

It is observed that the selectivity of olefins (LPG) is found to be 26.96% in the present invention compared to 23.41% in the additive prepared by using process disclosed in U.S. Pat. No. 528,636.

In another preferred embodiment, the zeolite catalyst used for preparation of attrition resistant catalyst is converted to phosphated zeolite slurry by combining the zeolite catalyst with phosphate source such as di-ammonium hydrogen phosphate in aqueous medium before adding it to the binder.

In one of the preferred embodiments, the zeolite is selected from the source comprising of mordenite, ZSM-5, beta, ZSM-11 with silica alumina ratio ranging from 8 to 500.

In further embodiment, the attrition resistant cracking catalyst additive composition can be used from 1-40 wt % with a base catalyst to produce LPG up to 27 wt % and up to 8.9 wt % of propylene.

In a preferred embodiment, the composition of present invention has LPG selectivity up to 27 wt %, propylene selectivity up to 8.9 wt % at 5 wt % concentration in base catalyst.

Further, the binder of the present invention allows loading of zeolite as high as 70 wt % at the same time maintaining attrition index. The proposed binder ensures smoother catalyst surface free of pits and cracks and the application of binder of this invention allows un-interrupted production of catalyst due to reduction in viscosity of catalyst precursor slurry which results in increase of catalyst throughput. Thus prepared binder has maximum of up to 2.9 moles of monobasic acid against three moles per mole of mono-aluminium phosphate prepared by conventional method. Introduction of calculated amount of anion radical in the form of salts of aluminium will ensure effective binding of catalyst as well as preserving catalytic activity with high selectivity towards olefins.

In the conventional method the aluminium phosphate is prepared using the aluminium nitrate and phosphoric acid as alumina and phosphate precursors. U.S. Pat. No. 5,194,412 to Roberie et. al. disclosed the following equation for preparation of aluminium phosphate:

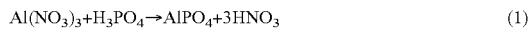

$$Al(NO_3)_3 + H_3PO_4 \rightarrow AlPO_4 + 3HNO_3 \qquad (1)$$

In the present invention, aluminium phosphate binder is prepared by reacting mono aluminium phosphate with salts of alumina. The aluminium phosphate is prepared according to the following equation in the present invention:

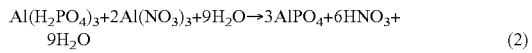

$$Al(H_2PO_4)_3 + 2Al(NO_3)_3 + 9H_2O \rightarrow 3AlPO_4 + 6HNO_3 + 9H_2O \qquad (2)$$

The equation (2) indicates that as per present invention, 2.0 moles of monobasic acids are formed as byproduct for the preparation of each mole of aluminum phosphate binder. Contrary to this, in the prior art reference (U.S. Pat. No. 5,194,412), 3 moles of monobasic acids are formed as byproduct for each mole of aluminium phosphate binder, as shown in equation (1).

As in the present invention, the ratio of MAP: alumina salts are varied in the range of 1:1 to 1:2.5, therefore the formation of the monobasic acid varies from 1.5 to 2.9 moles per mole of aluminium phosphate binder.

The invention will now be explained with the help of following examples. However, the scope of the invention should not be limited to these examples as the person skilled in the art can easily vary the proportion of the ingredients and combinations.

TABLE 1

Feed properties

| Sr No | Attributes | Unit | Value |
|---|---|---|---|
| 1 | Density @ 15° C. | g/cc | 0.881 |
| 2 | Kinematic Viscosity @ 100° C. | Cst | 6.59 |
| 3 | Distillation, D-1160 | | |
| 4 | IBP | ° C. | 311 |
| 5 | 5% | ° C. | 387 |
| 8 | 30% | ° C. | 430 |
| 9 | 50% | ° C. | 447 |
| 10 | 70% | ° C. | 470 |
| 11 | Sulphur | ppmw | 300 |
| 1 | Total N2 | ppmw | 47 |
| 13 | CCR | wt % | 0.09 |

Table 1 depicts the typical feed properties of a representative feed used in the refinery for FCC. The representative feed is used to evaluate the different additives under similar conditions.

EXAMPLES

Example-1

Additive Prepared as Per Example-7 of U.S. Pat. No. 7,517,827 and Increased Zeolite Content from 25 wt % to 40 wt %

98.63 gm of Pural SB grade alumina (having loss on ignition of 23.96 wt %) was made into a slurry with 425 gm of Demineralised (DM) water. The slurry was peptized with 21.52 gm of formic acid (85% concentration). 682.72 gm of ZSM-5 zeolite (loss on ignition 12.12 wt %) having silica to alumina molar ratio of 30 was made into a slurry with 700 gm of 10% ammonia solution followed by addition of 27.7 gm phosphoric acid (85%) to produce a zeolite slurry having pH of 7.8. 758.02 gm of kaolin clay (having loss on ignition 14.91 wt %) was made into a slurry with 800 gm DM water and kept under vigorous stirring while 191.53 gm of orthophosphoric acid (concentration 85 wt %) was added. Earlier prepared alumina gel and zeolite slurry were added to the clay-phosphate slurry one after another under vigorous stirring. Final slurry having a pH of about 2.9 was spray dried in a counter current spray drier having two fluid nozzles. Spray dried product was calcined at 550° C.

Calcined additive showed ABD of 0.78 g/cc and ASTM D5757 attrition index of 12. The catalyst is then steam de-activated and evaluated in Advanced Cracking Evaluation R+ Micro Activity Test unit at 5 wt % concentration in base catalyst. Physical properties along with performance results are shown in Table 2 & 3.

Example-2

Preparation of Additive Using Aluminium Phosphate Binder as Per Example-2 of U.S. Pat. No. 5,286,369

83.41 gm of di-ammonium hydrogen phosphate (DAHP) was dissolved in 500 gm of DM water and 454.55 gm of ZSM-5 zeolite (loss on ignition 12 wt %) having silica to alumina molar ratio of 30 was added to it under stirring to form phosphated zeolite slurry having pH of 7.2. 399.62 gm of kaolin clay (having loss on ignition 14.92 wt %) was made into a slurry with 400 gm DM water and kept under vigorous stirring while 664.45 gm of aluminium phosphate prepared as per the method mentioned in the Example-2 of U.S. Pat. No. 5,286,369 was added followed by addition of 333.33 gm of ammonium poly-silicate to form clay-silica-alumina phosphate slurry. Earlier prepared phosphated zeolite slurry was added to clay-silica-alumina phosphate slurry under vigorous stirring to form final ZSM-5 precursor slurry. The final slurry having a pH of about 0.5 was spray dried in a counter current spray drier having two fluid nozzles. Spray dried product was calcined at 550° C.

Calcined catalyst showed ABD of 0.79 g/cc and ASTM D5757 attrition index of 1.9. The catalyst is then steam de-activated and evaluated in Advanced Cracking Evaluation R+ Micro Activity Test unit at 5 wt % concentration in base catalyst. Physical properties along with performance results are shown in Table 2 & 3. Though the additive possess attrition index 1.9, but it shows inferior activity.

Example-3

Preparation of Mono-Aluminium Phosphate 223.94 gm of aluminium trihydrate (LOI=34 wt %) was dispersed in 380 gm of DM water to form alumina slurry then 1002.59 gm of phosphoric acid (85 wt %) was added to it to under stirring condition, while the mixture was maintained at a temperature of 70° C. and was kept for 1 hr to obtain clear solution of mono-aluminium phosphate. Solution was then cooled down to room temperature for use in additive preparation.

Example-4

Preparation of Additive Employing Mono-Aluminium Phosphate Prepared as Per Example-3

83.41 gm of di-ammonium hydrogen phosphate (DAHP) was dissolved in 500 gm of DM water and 454.55 gm of ZSM-5 zeolite (loss on ignition 12 wt %) having silica to alumina molar ratio of 30 was added to it under stirring to form phosphated zeolite slurry having pH of 7.2. 399.62 gm of kaolin clay (having loss on ignition 14.92 wt %) was made into a slurry with 400 gm DM water and kept under vigorous stirring while 174.31 gm of mono-aluminium phosphate (LOI=42.63) as prepared under Example-3 was added followed by addition of 333.33 gm of ammonium poly-silicate to form clay-silica-alumina phosphate slurry. Earlier prepared phosphated zeolite slurry was added to clay-silica-alumina phosphate slurry under vigorous stirring to form final ZSM-5 precursor slurry. The final slurry having a pH of about 0.7 was spray dried in a counter current spray drier having two fluid nozzles. Spray dried product was calcined at 550° C.

Calcined additive has ABD of 0.65 g/cc and ASTM D5757 attrition index of 3.9. The additive is then de-activated and evaluated in Advanced Cracking Evaluation R+ Micro Activity Test unit at 5 wt % concentration level along with base catalyst. Physical properties along with performance results are shown in Table 2 & 3. The additive shows lower activity.

Example-5

Preparation of Aluminium Phosphate Binder Based on Mono-Aluminium Phosphate (MAP) Prepared as Per Example-3 where the Mole Ratio of MAP: Al(NO$_3$)$_3$.9H$_2$O is 1:1

799.9 gm of mono-aluminium phosphate (LOI=42.63) as prepared under Example-3 was diluted with 310 gm of DM water and then 552.14 gm of Al(NO$_3$)$_3$.9H$_2$O was added under stirring to it and kept for 30 min to form aluminium phosphate binder solution.

Example-6

Preparation of Additive Using Aluminium Phosphate Binder Prepared as Per Example-5

83.41 gm of di-ammonium hydrogen phosphate (DAHP) was dissolved in 500 gm of DM water and 454.55 gm of ZSM-5 zeolite (loss on ignition 12 wt %) having silica to alumina molar ratio of 30 was added to it under stirring to form phosphated zeolite slurry having pH of 7.2. 399.62 gm of kaolin clay (having loss on ignition 14.92 wt %) was made into a slurry with 400 gm DM water and kept under vigorous stirring while 328.41 gm of aluminium phosphate (LOI=69.55) as prepared under Example-5 was added followed by addition of 333.33 gm of ammonium polysilicate to form clay-silica-alumina phosphate slurry. Earlier prepared phosphated zeolite slurry was added to clay-silica-alumina phosphate slurry under vigorous stirring to form final ZSM-5 additive precursor slurry. The final slurry having a pH of about 0.6 was spray dried in a counter current spray drier having two fluid nozzles. Spray dried product was calcined at 550° C. Calcined additive has ABD of 0.68 g/cc and ASTM D5757 attrition index of 3.5. The additive is then de-activated and evaluated in Advanced Cracking Evaluation R+ Micro Activity Test unit at 5 wt % concentration level along with base catalyst. Physical properties along with performance results are shown in Table 2 & 3. The additive shows lower activity.

Example-7

Preparation of Aluminium Phosphate Binder Based on Mono-Aluminium Phosphate (MAP) Prepared as Per Example-3 where the Mole Ratio of MAP: Al(NO$_3$)$_3$.9H$_2$O is 1:2

Aluminium nitrate solution prepared by dissolving 716.53 gm of Al(NO$_3$)$_3$.9H$_2$O in 310 gm of DM water was added to 519.09 gm of mono-aluminium phosphate (LOI=42.63) as prepared under Example-3 under stirring and kept for 30 min to form ready to use aluminium phosphate binder of present invention.

Example-8

Preparation of Additive Using Aluminium Phosphate Binder Prepared as Per Example-7 of Current Invention 399.62 gm of kaolin clay (having loss on ignition 14.92 wt %) was made into a slurry with 400 gm DM water and kept under vigorous stirring while 430.48 gm of aluminium phosphate (LOI=76.77) as prepared under Example-7 was added followed by addition of 333.33 gm of ammonium polysilicate to form clay-silica-alumina phosphate slurry. To clay-silica-alumina phosphate slurry, 1038 gm of phosphate zeolite prepared similar to procedure of Example-2 was added under vigorous stirring to form final ZSM-5 precursor slurry. The final slurry having a pH of about 0.5 was spray dried following the procedure of example-1. The green catalyst was calcined. Calcined additive has ABD of 0.78 g/cc and ASTM D5757 attrition index of 2.9. The additive is then steam de-activated and evaluated in Advanced Cracking Evaluation R+ Micro Activity Test unit at 5 wt % concentration level along with base catalyst. Physical properties along with performance results are shown in a Table 2A & 2B. The additive shows higher activity towards production of LPG.

Example-9

Preparation of Aluminium Phosphate Binder Based on Mono Aluminium Phosphate (MAP) Prepared as Per Example-3 where the Mole Ratio of MAP: $Al(NO_3)_3 \cdot 9H_2O$ is 1:2.5

Aluminium nitrate solution prepared by dissolving 761.94 gm of $Al(NO_3)_3 \cdot 9H_2O$ in 310 gm of DM water was added to 441.52 gm of mono-aluminium phosphate (LOI=42.63) as prepared under Example-3 under stirring and kept for 30 min to form ready to use aluminium phosphate binder of present invention.

Example-10

Preparation of Additive Employing Aluminium Phosphate Binder Prepared as Per Example-9 of Current Invention The catalyst was prepared similar to the Example-8 and evaluated except binder, employing 475.29 gm of binder (LOI=78.96) of Example-9. Calcined additive has ABD of 0.77 g/cc and ASTM D5757 attrition index of 3.1. The additive is then de-activated and evaluated in Advanced Cracking Evaluation R+ Micro Activity Test unit at 5 wt % concentration level along with base catalyst. Physical properties along with performance results are shown in Table 2 & 3. The additive shows higher activity towards production of LPG.

Example-11

Preparation of Additive as Per Example-8 by Replacing ZSM-5 with Beta Zeolite Having Si/Al Mole Ratio 20

Calcined additive has ABD of 0.75 g/cc and ASTM D5757 attrition index of 3.5.

TABLE 2

Additive composition and their physical properties prepared as per Example-1 to 11

|  | Example-1 Prepared as per U.S. Pat. No. 7,517,827 | Example 2 | Example 4 | Example 6 | Example 8 | Example 10 | Example 11 |
|---|---|---|---|---|---|---|---|
| Binder AlPO4, wt % | 0 | 10 (Prepared as per U.S. Pat. No. 5,286,369) | 10 (Prepared as per Example 3) | 10 (Prepared as per Example 5) | 14 (Prepared as per Example 7) | 10 (Prepared as per Example 9) | 10 (Prepared as per Example 7) |
| PSB Alumina | 5 | 0 | 0 | 0 | 0 | 0 | 0 |
| ZSM-5 Zeolite, wt % | 40 | 40 | 40 | 40 | 40 | 40 | 0 |
| Beta zeolite | 0 | 0 | 0 | 0 | 0 | 0 | 40 |
| Clay, wt % | 43 | 34 | 34 | 34 | 34 | 34 | 34 |
| $H_3PO_4$ (as $PO_4$), wt % | 12 | 0 | 0 | 0 | 0 | 0 | 0 |
| $(NH_4)_2HPO_4$ as $PO_4$. Wt % | 0 | 6 | 6 | 6 | 6 | 6 | 6 |
| $SiO_2$ | 0 | 10 | 10 | 10 | 10 | 10 | 10 |
| ABD, gm/cc | 0.78 | 0.79 | 0.65 | 0.68 | 0.78 | 0.77 | 0.75 |
| Attrition Index, ASTM D5757 | 12 | 1.9 | 3.9 | 3.5 | 2.9 | 3.9 | 3.5 |

TABLE 3

Performance results of additive prepared as per Example-1 to 10

|  | Base Catalyst + 5 wt % Additive of Example-1 | Base Catalyst + 5 wt % Additive of Example-2 | Base Catalyst + 5 wt % Additive of Example-4 | Base Catalyst + 5 wt % Additive of Example-6 | Base Catalyst + 5 wt % Additive of Example-8 | Base Catalyst + 5 wt % Additive of Example-10 |
|---|---|---|---|---|---|---|
| Cat/oil | 6.87 | 6.87 | 6.87 | 6.87 | 6.87 | 6.87 |
| 220° C. Conversion, wt % | 78.50 | 78.63 | 79.06 | 79.53 | 79.63 | 79.60 |
| Coke | 3.48 | 3.35 | 3.55 | 3.49 | 3.41 | 3.41 |
| DG | 1.78 | 1.77 | 1.78 | 1.80 | 1.79 | 1.79 |
| LPG (including propylene) | 24.99 | 23.41 | 23.91 | 24.33 | 26.46 | 26.96 |
| Propylene | 8.24 | 7.60 | 7.84 | 7.95 | 8.73 | 8.90 |
| Gasoline (C5-160° C.) | 38.55 | 40.05 | 40.27 | 40.19 | 38.82 | 38.29 |
| HN (160-220° C.) | 9.70 | 10.05 | 9.55 | 9.72 | 9.15 | 9.15 |
| LCO (220-360° C.) | 14.63 | 14.85 | 14.49 | 14.12 | 14.10 | 14.10 |
| Bottom (370° C.+) | 6.87 | 6.52 | 6.45 | 6.35 | 6.27 | 6.30 |

Table 2 depicts the physico-chemical properties of different additive formulations. As mentioned earlier ABD and AI of the sample prepared in example 2 (U.S. Pat. No. 528,636) is better than that of additive prepared in the present invention. The additive given in example 2 is prepared using aluminium nitrate as alumina precursor that results into production of excess of $HNO_3$ (3 moles per mole of aluminium phosphate binder). This destabilizes the ZSM-5 zeolite structure and deactivates during the preparation as well as equilibration. The above fact can be represented using the following equation.

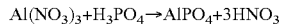

Table 3 clearly reflects the deactivation of ZSM-5 additive wherein LPG yield using example 2 is 23.41% vis-a-vis 26.96% for the additive formulation of the present invention.

Calculated amount of aluminium nitrate is added during the preparation of aluminium phosphate binder and amount nitric acid (by-product) is controlled. This methodology is optimized in a way that the additive formulation will have better attrition index (ASTM D-5757)<5 and ABD>0.75 gm/cc and at the same time deactivation ZSM-5 zeolite is controlled. In a nutshell, the customized binder used in the present invention attains the desired physico-chemical properties and also retains the catalytic activity with high selectivity towards olefins.

We claim:
1. An attrition resistant hydrocarbon cracking catalyst additive composition comprising 10-70% wt % zeolite, 5-20 wt % colloidal silica, 10-60 wt % clay, 1-10 wt % phosphate and 1-15 wt % aluminium phosphate binder, wherein the aluminium phosphate binder is a reaction product of mono aluminium phosphate and an aluminium compound in the mole ratio of 1:1 to 1:2.5: wherein said zeolite is selected from mordenite, ZSM-5, beta, ZSM-11 with silica alumina ratio ranging from 8 to 500.

2. The composition as claimed in claim 1, wherein said additive has ABD above 0.75 gm/cc, AI based on ASTM D-5757 is less than 5 and average particle size is in the range of 80-100 microns.

3. The composition as claimed in claim 1, wherein said aluminium compound is selected from salts of aluminum.

4. The composition as claimed in claim 3, wherein said salts of aluminum are selected from the group comprising of aluminum nitrate, aluminum sulphate, alumina chloride, aluminum acetate and aluminum oxalate.

5. The composition as claimed in claim 4, wherein said salts of aluminum in-situ generates monobasic acid.

6. The composition as claimed in claim 5 wherein the monobasic acid varies from 1.5 to 2.9 moles per mole of aluminum phosphate binder.

* * * * *